United States Patent

Wolf et al.

[11] Patent Number: 5,114,492
[45] Date of Patent: May 19, 1992

[54] PROCESS FOR SEPARATING CARAMEL COLORS

[75] Inventors: Peter A. Wolf, South Salem, N.Y.; Setlur R. Ramaswamy, Louisville, Ky.

[73] Assignee: PepsiCo Inc., Purchase, N.Y.

[21] Appl. No.: 572,717

[22] Filed: Aug. 24, 1990

[51] Int. Cl.⁵ .................. C13D 3/16; C13J 1/08
[52] U.S. Cl. .................. 127/42; 127/DIG. 1
[58] Field of Search ............ 127/42, DIG. 1

[56] References Cited

U.S. PATENT DOCUMENTS

| | | | |
|---|---|---|---|
| 2,533,221 | 6/1947 | Cleland et al. | 127/29 |
| 2,902,393 | 9/1959 | Meyer et al. | 127/DIG. 1 |
| 3,249,444 | 5/1966 | Bollenback et al. | 426/540 |
| 4,416,700 | 11/1983 | Clark et al. | 127/34 |

Primary Examiner—Theodore Morris
Assistant Examiner—P. L. Hailey
Attorney, Agent, or Firm—Scully, Scott, Murphy & Presser

[57] ABSTRACT

The present invention relates to the separation of color solids from caramelized carbohydrate solutions by the use of ultrafiltration, and more particularly, to a continuous process for separation of these solids into a color fraction and a non-color fraction with recycle of the non-color fraction to produce color bodies having an acceptable flavor for use in beverages or food.

7 Claims, 1 Drawing Sheet

PROCESS FOR SEPARATING CARAMEL COLORS

FIELD OF THE INVENTION

The present invention relates to the separation of color solids from caramelized carbohydrate solutions by the use of ultrafiltration, and more particularly, to a continuous process for separation of these solids into a color fraction and a non-color fraction with recycle of the non-color fraction to produce color bodies having an acceptable flavor for use in beverages or food.

PRIOR ART

Caramel colors are food ingredients used to impart brown color of varying shade and intensity to a wide range of foods and beverages. By far, the largest use of caramel colors are in cola beverages. Significant amounts of caramel colors are also used in beer, bakery products, soy sauce and distilled spirits.

Caramel colors are of different physical characteristics and composition. The soft drink caramel colors are made by reacting any acceptable food grade carbohydrate with ammonium sulphites. The brewery caramel colors are made by reacting carbohydrates with ammonia only. The caramel color used in high alcohol content distilled spirits is obtained by heating sugar with sodium hydroxide.

The soft drink caramels are negatively charged colloidal bodies at the pH levels of their use, while the beer caramels are positively charged. These colloidal charges are important to their functionality in the product as otherwise product instabilities like haze or sediment will develop. Each type of caramel color can be reacted to different color intensities. The caramel colors are used as viscous liquids and dry powders in various types of dry blend products.

Caramel color solids can be separated into two parts. One part contains most of the caramel's coloring capacity while the other part has very little. The non-color part of the caramel is a major part of the starting caramel and ends up as a liquid of low solids content posing an effluent disposal problem. The color part of the caramel is also several orders of magnitude larger in molecular weight than the non-color part. It is this difference in the molecular weights between the color and non-color part of the caramel that makes their separation possible by ultrafiltration. The main incentive of separating the caramel into its color components and non-color components is that the color bodies are several times more potent in their coloring ability than the parent material from which they are separated. Hence smaller quantities are needed in the product which could result in cost savings as well as product quality improvements. Also the separated caramel color bodies, when dried, yield a stable non-hygroscopic powder without addition of any carrier or drying aid, such as calcium hydroxide, starch, or maltodextrins.

Processes for separating caramel color bodies from the caramels used in soft drinks, beer, and alcoholic beverages have been developed by using membrane separation techniques of ultrafiltration and reverse osmosis (U.S. Pat. No. 4,416,700 to Clark et al. and U.S. Pat. No. 3,249,444 to Bollenback et al.). The caramel color bodies have also been separated by treating caramel colors with alcohol and precipitating the color components as shown by Cleland et al. U.S. Pat. No. 2,533,221 and Meyer et al. U.S. Pat. No. 2,902,393. Attempts have also been made to separate caramel color bodies by chromatographic methods (Tibbetts et al. U.S. Pat. No. 4,325,743) and by dialysis (Cleland et al. U.S. Pat. No. 2,701,768). However, these patents with the exception of Cleland et al. and Meyer et al. do not suggest recooking the non-color part of the caramel to obtain additional color bodies. Recooking of the non-color components according to the methods of Cleland et al. and Meyer et al. yield color bodies having 3 to 5 times the tinctorial power of the original caramel color. However, the processes are complicated, expensive and present a fire hazard making commercial utilization of the process unattractive.

SUMMARY OF THE INVENTION

It would therefore be desirable to provide a continuous process for separating the essential constituents (color bodies) of caramel color from the residual carbohydrates (non-color bodies) and to provide for the recycle of the latter so as to utilize essentially all of the carbohydrate for production of color without the detrimental mercaptan flavor normally associated with recycle and recaramelization of the non-color bodies.

Another objective of this invention is to provide a process for recaramelizing the residual carbohydrate (noncolor bodies) recovered from the separation steps to produce additional color bodies of equivalent quality to the color bodies previously removed.

Another object of this invention is to produce color from the reclaimed carbohydrate (non-color bodies) that will be equal in quality to that produced from new carbohydrate.

The objects of this invention are attained by separating caramel color bodies from a caramelized carbohydrate solution by the use of ultrafiltration through a semi-permeable membrane to yield a permeated fraction which passes through the membrane and a retained fraction which does not pass through the membrane, said retained fraction comprising the high molecular weight color bodies, removing the color bodies, recovering the uncaramelized carbohydrate solution, concentrating the reclaimed carhobydrate solution to at least 30% solids, adding fresh make-up reaction mixture of carhobydrate and chemical (ammonium-sulphite) to the reclaimed and concentrated carhobydrate solution in an amount sufficient to equal 80% to 350% by weight the amount of caramelized carhobydrate taken out as color and lost during the process, recaramelizing the concentrated reclaimed carhobydrate and fresh make-up carhobydrate and repeating the color separation, recycle, and make-up steps a plurality of times. As the amount of caramel lost during the process approaches zero, the amount of makeup material approaches 1 to 1 or 100%.

The term "carhobydrate" means any edible carbohydrate material permitted by regulatory agencies to be caramelized for food use. Usually, this is a sugar such as corn syrup, sucrose, dextrose, invert sugar, molasses, or malt syrup.

DETAILED DESCRIPTION OF THE INVENTION

Figure 1:
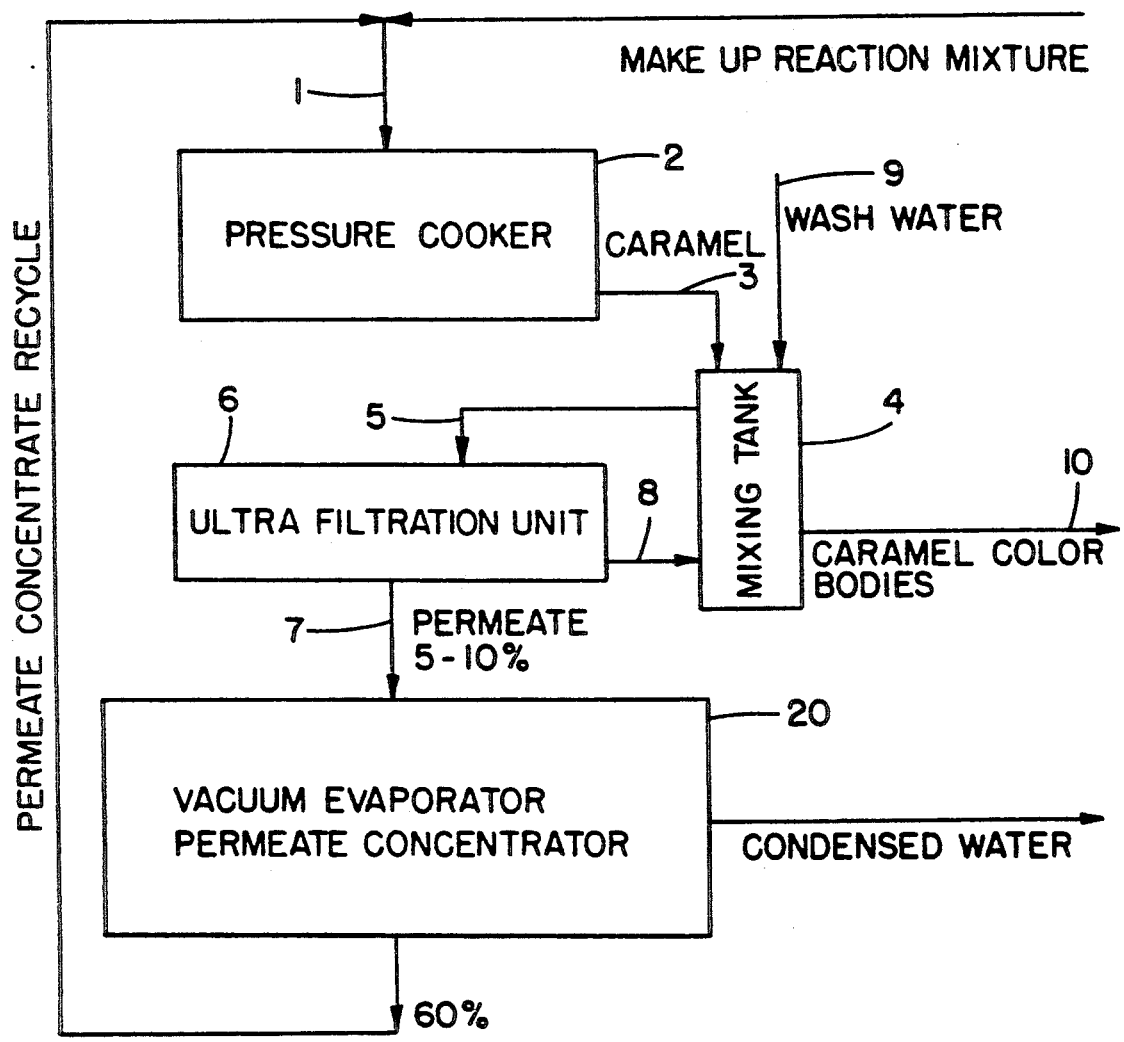

Ultrafiltration is a process by which a sample can be treated to separate materials of relatively high molecular weight from those of lower molecular weight. The process involves placement of a water solution of the sample on one side (retentate side) of a semi-permeable membrane sized so as to retain materials i the sample above a particular molecular weight but allow the passage, with solvent, of those below a particular molecular weight. Hydrostatic or hydrokinetic pressure is applied to the sample solution, and continuous or periodic addition of solvent to the sample solution allows the ultrafiltration to continue for a time sufficient to reach a theoretically high degree of removal of permeable materials from the sample.

Ultrafiltration of caramel color results in a useful caramel color concentrate since the high molecular weight materials which do not permeate through the semi-permeable membrane constitute a large portion of the materials responsible for the coloring properties of caramel color whereas those materials which do permeate constitute a large portion of the non-colorant materials.

The separation of the caramel color bodies into a color fraction and a non-color fraction is accomplished by using polymeric or cellulosic membranes. The semi-permeable membrane used is such that materials having a molecular weight above about 10,000 daltons are unable to pass through its pores. This membrane thus separates the higher and lower molecular weight components of caramel color in a useful manner, since most of the coloring components are above a molecular weight of 30,000 daltons whereas the components below 2,000 daltons are those of little color. Accordingly, a membrane with a cut-off of 10,000 daltons is preferred. However, the permeability of the membrane may be affected by temperature, pressure, concentration, and the like. Thus, according to the process of this invention, both the particular semi-permeable membrane and the conditions of operation are selected so as to result in the desired exclusion of materials above a molecular weight of about 10,000 daltons. Selection of membranes or conditions which allow materials having molecular weights above 10,000 daltons to permeate through the membrane will normally result in the undesirable increased loss of color bodies from the caramel. Alternatively, the use of a membrane which has excessively small pores would result in too large a retention of low molecular weight components.

Referring to the drawing, the single FIGURE is a schematic diagram of a flow sheet disclosing successive steps in the process and combination of apparatus according to the invention. The apparatus can be described broadly as a stainless steel pressure cooker 2, a feed tank 4, an ultrafiltration unit 6 and a vacuum evaporator 10.

The carbohydrate syrup 1 comprising a solution of sugar and chemical (sulphites of ammonium) are charged into the pressure cooker 2. The ingredients are mixed and heated to a reaction temperature of about 250° to 1000° F. The resulting pressure could be 30 to 225 psig. In about 5 minutes to 3 hours, depending on the temperature and pressure used, the reaction is completed and the contents of the cooker are blown down to atmospheric pressure to arrest the reaction and obtain the desired colored product. The caramel 3 is cooled and is then fed to the subsequent steps of color body separation, i.e. the feed tank 4 and the ultrafiltration unit 5. The feed is diluted to lower the viscosity, typically dilutions of 1:1 to 3:1 of caramel color to water can be used. This liquid 5 is recirculated through the ultrafiltration unit 5 and the stream of filterate called the permeate 7 is constantly removed. The non-permeating portion of the feed material called the retentate 8 is recycled back to the feed tank. Clean water 9 is introduced to the feed tank at about the same flow rate as the permeate and mixed. The feed tank contents volume pretty much remains the same as at the start. As the operation continues, the low molecular weight species is progressively washed out and the material in the feed tank becomes richer in high molecular weight species. The high molecular weight content of the purified material (caramel color bodies) 10 depends on the extent of washing and usually ranges above 95% on a solids basis. The permeate from the ultrafiltration step is low in solids and is concentrated in vacuum evaporator 20. The percent solids in the permeate is around 5 to 10 percent and is concentrated to about 60%.

The solids level of the permeate concentrate is a critical factor in obtaining caramel color bodies of acceptable qualities in the successive recook cycles.

For example, when dilute permeate is recooked at normal caramelization temperatures and pressure it can achieve several times the color intensity of the conventional caramel color. These high intensity low solids caramel colors give brilliant clear solutions and are also stable from the point of view of haze and sediment in cola beverages. However, these caramels all have strong mercaptan/sulphidic odors and they impart these odors to the beverages even at very low concentrations and as such are totally unusable in foods and beverages. This is unexpected. Also the molecular weight profile of these materials are similar to the normal caramel colors. A perfectly acceptable double strength caramel color when diluted with water and heated to caramelization reaction temperature for a short time, results in a caramel taste that is mercaptan/sulphidic. Therefore excess water has been found to be detrimental to the caramel color quality. Caramelization reaction mixtures less than 30% solids given unusable caramel colors when cooked to the normal color strengths. The present solids of the caramel reaction mixture should be above 30, and preferably 60% solids. This critical concentration holds good even for the recooking of any low solids caramel stream. But even at these concentration levels when the low solids stream is recycled or recaramelized as part of a continuous process the product then turns out to be unusable (due to the odor) after 2 or 3 cycles.

The permeate concentrate is blended with fresh reaction mixture and cooked in the usual manner to the desired color strength. The relative quantities of permeate concentrate, carbohydrate and chemicals are usually in the same proportion as permeate concentrate solids to the caramel color bodies removed in the ultrafiltration step. However, some latitude is allowed so that between 80% to 350% of the carbohydrate removed (as caramelized polymer) can be added as make-up. This addition of the virgin (carbohydrate + caramelization chemicals) reaction mixture to permeate concentrate before recook is critical to the product quality.

The foregoing is illustrative of one combination of apparatus employed to carry out the separation and recycle techniques of this invention. Many other combinations of apparatus are available for achieving the same results.

Further details are provided with reference to the following illustrative example.

EXAMPLE

A series of eight (8) recycle cooks in accordance with above schematic were conducted to investigate the taste and odor qualities of residual sugar permeate as shown in the following table.

TABLE 1

| Cook # | Dextrose M.H. | Chemical | Permeate Concentrate | Water | Total |
| --- | --- | --- | --- | --- | --- |
| 1 | 1100 | 607.3 | 0 | 235 | 1942.3 |
| 2 | 648.5 | 358.0 | 846 | 138 | 1990.5 |
| 3 | 610 | 336.8 | 937 | 130 | 2013.8 |
| 4 | 610 | 336.8 | 912 | 130 | 1988.8 |
| 5 | 543.2 | 300.0 | 1078 | 115.8 | 2037.0 |
| 6 | 660.6 | 364.9 | 948 | 140.8 | 2114.3 |
| 7 | 612.6 | 338.4 | 962 | 130.6 | 2043.6 |
| 8 | 602.3 | 332.8 | 896.2 | 128.4 | 1959.7 |
| Avg. Runs 2 to 8 | 612.4 | 338.2 | 939.9 | 130.5 | 2021.1 |

In these runs, dextrose monohydrate was used as the sugar, the chemical was ammonium sulphite and water, and water was used as the diluent. Thus, in cook #1, 1100 gms of dextrose monohydrate was mixed with 607.3 gms of chemical (56.6 gms $NH_3$, 180.55 gms $SO_2$, and 370.15 gms $H_2O$) and 235 gms of water to give a total reaction mixture of 1942.3 gms. The product was heated at 300° F. until a desired tinctorial power was obtained. Caramel blown out from the cooker was 1300 gms (solids 754 gms), caramel color body solids in retentate was 215.2 gms and caramel non-color component solids from permeate was 507.6 gms. Thus in cook #2, the reaction mixture solids to be charged to the cooker are the same as cook #1, namely 1237.15 gms comprised of 507.6 gms of recycled solids (which are the solids from the permeate) and 729.55 gms of fresh reaction mixture.

The fresh reaction mixture is made up of dextrose, $NH_3$, $SO_2$ and water in the same proportion as cook #1. The amounts are thus 648.5 gms for the dextrose monohydrate, 358 gms for the chemical (33.37 gms $NH_3$, 106.43 gms $SO_2$, and 218.20 gms water) and 138 gms water to give a total of 1990.5 gms.

Similar computations were made for each successive run to arrive at the fresh reaction mixture to be added to each successive cook.

The material obtained in each of these eight recycle cooks were acceptable for use in beverages. Also, the Molecular Size Exclusion Chromatographic Analysis customarily used to separate, analyze and profile caramel mixtures, indicated that the composition of all the batches was identical. There was no deterioration of the material quality as the recook cycles went from 1 to 8. Attempts to recook the permeate of low solids concentration without the addition of any fresh reaction mixture resulted invariably with caramel color of strong off odor (typically a sulphidic or mercaptan off-flavor).

While the present invention has been described with reference to a particular embodiment, it is understood that numerous modifications can be made without departing from the spirit and scope of this invention.

What is claimed is:

1. A continuous process for producing ammonium sulphite caramel color having an acceptable flavor for beverage and food use which comprises caramelizing a carbohydrate solution to form high molecular weight color bodies, subjecting said caramelized solution to ultrafiltration through a semi-permeable membrane to give a permeated fraction and a retained fraction, said retained fraction comprising the high molecular weight color bodies, removing the color bodies, recovering the permeate, concentrating the permeate to at least 30% solids, adding fresh make-up reaction mixture to the reclaimed and concentrated permeate at least in an amount sufficient to make-up for the reaction mixture removed as color, recaramelizing the concentrated permeate and make-up reaction mixture to produce color bodies of acceptable flavor for beverage use, and repeating the color separation, recycle, and make-up steps a plurality of times.

2. The process of claim 1 wherein the fresh make-up reaction mixture contains carbohydrate.

3. The process of claim 1 wherein the fresh make-up reaction mixture contains carbohydrate and ammonium sulphite.

4. The process of claim 1 wherein the permeate is concentrated to at least 60% solids.

5. The process of claim 3 wherein the permeate is concentrated to at least 60% solids.

6. The process of claim 5 wherein the amount of fresh reaction mixture added to the permeate is equal to between 80% to 350% of the amount of carbohydrate and ammonium sulphite removed.

7. The process of claim 5 wherein the amount of fresh reaction mixture added to the permeate is equal to about 100% of the amount of carbohydrate and ammonium sulphite removed.

* * * * *

UNITED STATES PATENT AND TRADEMARK OFFICE
CERTIFICATE OF CORRECTION

PATENT NO. : 5,114,492

DATED : May 19, 1992

INVENTOR(S) : Peter A. Wolf, et al.

It is certified that error appears in the above-identified patent and that said Letters Patent is hereby corrected as shown below:

Column 2, line 67: "i" should read as --in--

Column 3, line 42: insert "BRIEF DESCRIPTION OF THE DRAWINGS" as a new line.

Column 6, line 23: "make-up" should read as --compensate--

Signed and Sealed this

Twenty-first Day of September, 1993

Attest:

BRUCE LEHMAN

Attesting Officer

Commissioner of Patents and Trademarks